May 24, 1955  J. W. McCARTHY  2,708,983
RECOVERY OF ELEMENTARY SULFUR FROM GASES
Filed Nov. 10, 1952
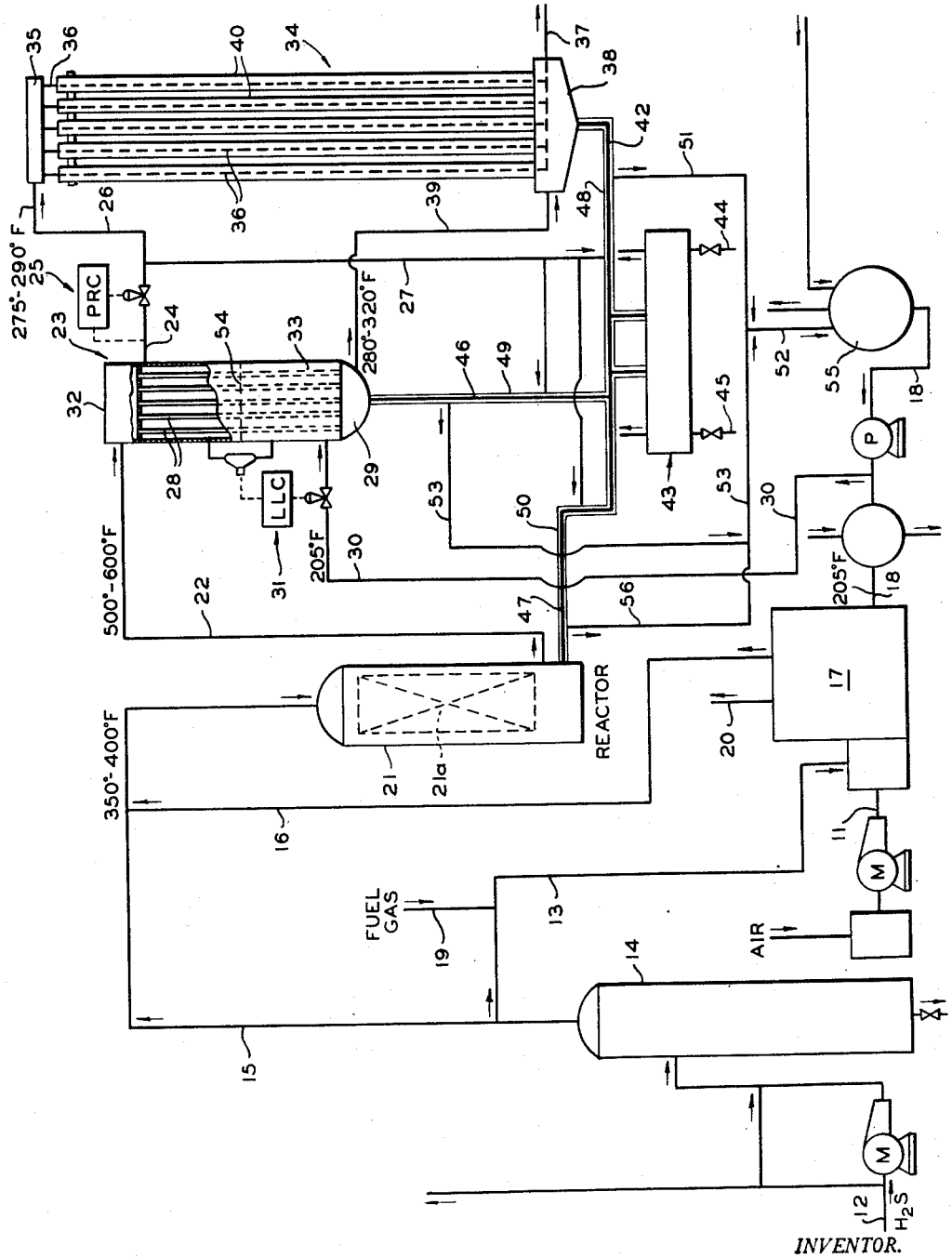
INVENTOR.
J. W. McCARTHY
BY Hudson & Young
ATTORNEYS

United States Patent Office 2,708,983
Patented May 24, 1955

2,708,983

RECOVERY OF ELEMENTARY SULFUR FROM GASES

John W. McCarthy, Bartlesville, Okla., assignor to Phillips Petroleum Company, a corporation of Delaware Application November 10, 1952, Serial No. 319,677

5 Claims. (Cl. 183—119)

This invention relates to the production and recovery of sulfur. In one aspect this invention relates to the production and recovery of sulfur from hydrogen sulfide containing gases. In another aspect it relates to a process for the production and recovery of sulfur from gases containing hydrogen sulfide by a process which is self-sufficient or substantially so as regards process steam requirement.

It is old in the art to pass gases containing hydrogen sulfide and sulfur dioxide through a converter, pass the effluent from the converter through a system of air-cooled tubes wherein sulfur vapors are separated and the effluent gases therefrom are passed through a stack to the atmosphere. The individual tubes in the system may be provided with small steam lines.

It is also known to condense sulfur from hot gases by means of water condensers wherein a portion of the sulfur is condensed and recovered as a liquid and the remainder of the sulfur is separated from the effluent gases as finely divided sulfur in scrubbing operation. The use of scrubbing methods for recovering finely divided sulfur from the effluent gases of water condensers is satisfactory for plants of relatively large capacity but in small capacity plants the use of such equipment is ordinarily not warranted.

An object of my invention is to provide a process for recovering sulfur from converter effluent gases in plants of relatively small capacity.

Another object of my invention is to provide a method of operation of water condensers without the production of sulfur fog in the gas stream.

Still another object of my invention is to provide apparatus and a method for its operation for removing final quantities of sulfur not recoverable by water condensers.

Yet another object of my invention is to provide a method for operating water condensers for recovery of sulfur from a gas stream wherein the water condenser is so operated as to produce steam in amounts and pressure required for the operation of the sulfur recovery plant.

Still another object of my invention is to provide a method for the operation of a water condenser for the recovery of sulfur from a gas stream without the production of sulfur fog in the gas stream so that subsequent removal of final quantities of sulfur may be efficiently carried out.

Still other objects and advantages of my invention will be realized upon reading the following disclosure which taken with the attached drawing forms a part of this specification.

I achieve these and other objects and advantages by operating a water condenser for condensing sulfur from a hot gas stream with a relatively low water level surrounding the condenser tubes in such a manner that heat is slowly removed from the gas stream in the portion of the condenser above the water level so as to avoid formation of sulfur fog and more rapidly removing heat from the gas stream in the water section of the condenser. In this manner a considerable proportion of the sulfur is condensed on the walls of the tubes which are in contact with the steam above the water level. When a large proportion of the sulfur is thus removed most of the remaining sulfur may be relatively rapidly condensed from the gases in indirect heat exchange with the water in the lower section of the condenser. Care is exercised to condense as much of the sulfur as possible at a temperature below about 320° F. so as to avoid production of liquid sulfur of high viscosity, which type of sulfur is frequently termed plastic sulfur.

In the drawing the figure represents in diagrammatic form one preferred embodiment of apparatus for carrying out my process.

Referring now to the drawing, a hydrogen sulfide containing gas stream, from a source, not shown, is passed through a pipe 12 into a mist extractor 14. The hydrogen sulfide is preferably of relatively high concentration such as that produced in acidic gas separation plants. The hydrogen sulfide issues from the mist extractor 14 through a pipe 15 and a portion thereof is passed through a pipe 13 and mixed with air from a pipe 11 and the mixture is passed into a burner for converting the hydrogen sulfide to sulfur dioxide. Heat evolved in this combustion reaction is utilized for producing steam in a waste heat boiler 17. Feed water, at for example 205° F. is introduced into this waste heat boiler through a water feed line 18. Steam issues from this boiler through a live steam line 20 for any use as desired. The firebox of this boiler should of course be gas-tight or substantially so to prevent loss of valuable sulfur dioxide. Burned gases from the boiler apparatus 17 containing a high concentration of sulfur dioxide are passed through line 16 and combined with the remainder of the hydrogen sulfide gas in line 15 and the mixture passed into the top of a catalyst chamber 21.

A line 19 is connected with line 13 for introduction of fuel gas to heat boiler 17 when starting up the operation.

In the catalyst chamber 21 is provided a quantity of preferably bauxite 21a for promoting the reaction of hydrogen sulfide with sulfur dioxide to produce elementary sulfur. The temperature of the sulfur dioxide gas passing through line 16 is such that when mixed with the hydrogen sulfide in line 15 the gaseous mixture has temperatures of about 350° to 400° F. The construction and operation of such bauxite catalyst converters are well known to those skilled in the art and details will not be given herein for purposes of brevity.

Effluent gases from the converter 21 are conducted through a line 22 at a temperature from about 500° to 600° F. These gases contain sulfur vapor of concentration dependent upon the hydrogen sulfide content of the feed gas to the process and upon other conditions. These sulfur containing gases are passed from line 22 into a top header portion 32 of a water condenser 23. This feed material passes downward through heat exchange tubes 28. In the section of the tubes 28 above the water level 54 the cooling of the hot gases is relatively slow since the steam in contact with the exterior of the tubes 28 removes heat therefrom relatively slowly. Thus, the cooling in the upper portion of the tubes 28 is relatively slow so that as the dew point of the sulfur is reached chilling will not result with the formation of either solid or viscous liquid or plastic fog droplets of sulfur. Whether the fog particles are a solid or liquid appears to be of little consequence in the formation of a stable fog.

As the sulfur containing gases are cooled somewhat with resulting condensation of liquid sulfur on the surface of the tubes 28 the gases pass on downward through these tubes into the water section 33 of this condenser wherein the removal of heat is relatively rapid. It is intended to condense the sulfur at a temperature below about 320° to avoid production of viscous or plastic sulfur. Feed water at a temperature of about 205° F. is introduced into this water condenser through a pipe 30 in response to the operation of a liquid level controller device 31. Steam as produced by this exchange operation is removed from this condenser through a pipe 24 for such use as desired. Any desired pressure is held in the water and steam section of this exchanger by a back pressure controller 25. Condensed liquid sulfur drains into the bottom 29 of this condenser 23, which bottom may be termed a sump. From this sump 29 liquid sulfur is withdrawn through a pipe 46 and introduced into a run tank 43.

Gases stripped of the major proportion of the sulfur content are removed from the condenser 23 through a line 39 and are introduced into the bottom header portion 38 of an atmospheric cooler 34. This atmospheric cooler 34 is provided with a plurality of tubes or pipes 40 disposed vertically with their bottom ends communicating with this header space 38 and the upper ends open to the atmosphere. A small diameter tube 36 is disposed axially in each one of the condenser tubes 40. The top ends of these small diameter tubes 36 are connected to a steam header 35 into which steam is passed from line 24 by a pipe 26. Steam is collected from the bottom of these tubes 36 for such disposal as desired by a pipe 37. Preferably this tube 37 is connected with a boiler water tank 55. A conduit 42 leads from the bottom of the sump 38 to the sulfur storage tank 43 for passage of sulfur. A conduit 47 connecting the bottom of the catalyst vessel 21 is for passage of sulfur therefrom into the tank 43 in case sulfur condenses in the bottom of this vessel.

Each of the pipes or conduits which carry liquid sulfur is steam jacketed to prevent solidification of the sulfur. For example conduits 42, 46 and 47 are provided with steam jackets 48, 49 and 50, respectively. Steam for use in these steam jackets is passed from line 26 through a line 27 and through several branches into the jackets 48, 49 and 50. Exhaust steam from jackets 48, 49 and 50 is passed through lines 51, 53 and 56, respectively into a line 52 and thence into the boiler water run tank 55. Pipes 44 and 45 are for outlet of sulfur from tank 43 for loading into tank trucks or railway cars.

In the operation of the process of my invention I provide the water level 54 in the sulfur condenser 23 at such a level that the sulfur condensed in the tubes 28 is condensed as a liquid and the gases emerging from this condenser through line 39 contains no sulfur fog or substantially none. When the water level 54 is maintained too high in this condenser sulfur fog will be produced which fog may be observed in the gases venting from the top of the atmospheric cooling tubes 40. Thus when starting up such a plant it may be difficult before hand to anticipate a proper level of water but as soon as operation is underway the level may be lowered to such an extent that fog disappears from the exhaust gases.

In a specific operation an acidic gas containing about 55 volume per cent hydrogen sulfide, 43 volume per cent $CO_2$ and 2 volume per cent of hydrocarbon from a source, not shown, is introduced into mist extractor 14 through pipe 12. After passing through mist extractor 14 this gas is divided into two portions, about 40 per cent by volume being passed through line 13 and mixed with air from line 11 and burned for the production of $SO_2$ and steam in the boiler apparatus 17. Feed water at about 205° F. from line 18 is converted into steam at about 150 pounds pressure. The combustion gases from this operation, containing a high concentration of sulfur dioxide, are passed through line 16 and combined with the unburned 60 volume per cent of the $H_2S$ gas from the mist extractor 14. This mixture has a temperature of about 350° to 400° F. and at this temperature it is passed into the catalyst chamber 21 containing bauxite. In this catalyst the sulfur dioxide and the hydrogen sulfide react to form elementary sulfur in an exothermic reaction. The effluent from this catalyst chamber 21 has a temperature of from 500° to 600° F. This sulfur containing gas at this temperature is passed into the water condenser 23 in which the level of the water 54 is so adjusted that sulfur fog will not issue from the top of the atmospheric cooling pipes 40. Feed water is introduced at about 205° F. into this condenser and steam is withdrawn through pipe 24 at a temperature of about 275° to 290° F. which temperature corresponds approximately to 30 to 43 pounds gage pressures respectively. A portion of this steam is passed through line 26 into header 35 for passage downward through the steam tubes 36. These steam tubes 36 are for the express purposes of maintaining the walls of the atmospheric cooling tubes 40 at a temperature above the solidification temperature of sulfur so that the sulfur which condenses on tubes 40 will condense as a liquid. Condensed liquid sulfur may then easily drain downward into the sump 38. In times of extraordinary cold weather more steam is flowed through the tubes 36 so that the sulfur will not condense on the pipes 40 as a solid since obviously solid sulfur will not drain into the sump 38.

The water condenser 23 is also operated under conditions so that the temperature of the effluent sulfur containing gases in line 39 will have a temperature between the limits of 280° to 320° F.

This gas should not be permitted to enter line 39 at a temperature above about 320° F. since under such a condition the sulfur would be condensed in the tubes 28 at a temperature above 320° F. with the production of the very viscous or plastic sulfur which as mentioned above will not flow downward by gravity into the sump 29 and the tubes 28 may plug with sulfur. It is preferable to maintain the effluent gases from the condenser 23 at a temperature within a narrow range, preferably such as from 290° to 310° F.

In so operating the water condenser 23 with the inlet sulfur containing gas having a temperature of 500° to 600° F. and the outlet sulfur containing gas having a temperature from 280° to 320° F. I am able to condense 95 per cent of the sulfur. From 2 to 3 per cent of the remaining 5 per cent of sulfur is condensed as liquid in the atmospheric condenser 34.

One advantage in the use of such an atmospheric condenser as condenser 34 is by use of the steam lines 36 to maintain the temperature of tubes 40 above the melting point of sulfur yet below the dew point of gas containing a low concentration of sulfur this apparatus serves as a gas disposal stack. And under such conditions a separate stack for gas disposal is not needed this advantage makes a considerable saving in capital investment.

Another advantage of my process is that by operating the water condenser 23 as herein disclosed I am able to produce sufficient high temperature steam to jacket the pipes carrying elementary sulfur and to furnish sufficient steam for maintaining the sulfur in the storage tank 43 as a liquid.

Obviously conduit 16 carrying the sulfur dioxide gas should be well insulated against heat loss. In addition to exterior insulation it is preferable to line this pipe with some refractory and chemically resistant material. The portion of line 15 from the point of junction with line 16 to catalyst chamber 21 and the catalyst chamber should be well insulated and lined. The steam jackets surrounding the pipes carrying liquid sulfur, the feed water tank 55, the feed water lines and the live steam lines, of course, should be well insulated.

Such auxiliary apparatus as valve, pressure and temperature indicating, recording and controlling devices and the like are not shown herein nor described for purposes of simplicity since their need, installation and use are well understood by those skilled in the art. Materials of construction should be selected from among those commercially available taking into consideration the corrosive characteristics of materials in process.

While the above flow diagram has been described for illustrative purposes the invention is obviously not limited thereto.

I claim:

1. A process for recovering elementary sulfur from hot gases containing elementary sulfur issuing from a free sulfur producing reaction comprising slowly cooling said gases to a temperature below the dew point but above the freezing point of sulfur whereby a portion of the elementary sulfur content condenses to liquid sulfur, rapidly cooling the partially sulfur depleted gases to a temperature from about 280° to 320° F. whereby additional sulfur condenses as liquid, passing the further cooled sulfur containing gases in indirect heat exchange relation with the atmosphere in an upflowing direction, maintaining the temperature of the indirect heat exchange surface above the freezing point of elementary sulfur whereby further liquid sulfur condenses on said indirect heat exchange surface, exhausting the sulfur depleted gases to the atmosphere and recovering the condensed sulfur as the product of the process.

2. A process for the separation of elementary sulfur and its recovery from a hot gas containing elementary sulfur issuing from a free sulfur producing reaction, comprising passing said gas in indirect heat exchange with steam at a steam pressure of about 30 to 43 pounds gage pressure per square inch and thereby slowly cooling said gas to a temperature slightly below its dewpoint but above the freezing point of sulfur whereby a portion of the sulfur condenses as liquid sulfur, passing the partly depleted sulfur containing gas in indirect heat exchange relation with hot water from which said steam is produced thereby condensing additional sulfur as liquid, passing this latter partially sulfur depleted gas at a temperature of about 280° to 320° F. into the bottom of a vertically disposed indirect atmospheric cooler, maintaining the condensing surface of the atmospheric cooler at a temperature above the freezing point of sulfur but below the temperature of the inlet sulfur containing gas whereby further liquid sulfur is condensed, exhausting the sulfur depleted gas to the atmosphere at a temperature above the freezing point of sulfur and recovering the condensed sulfur as the product of the process.

3. A process for the separation of elementary sulfur and its recovery from a hot gas containing elementary sulfur issuing from a free sulfur producing reaction, comprising passing said gas into the upper end of an indirect heat exchange zone and in a downward direction, cooling said sulfur containing gas slowly therein by indirect heat exchange with saturated steam at a pressure of about 30 to 43 pounds pressure per square inch gage whereby liquid sulfur condenses, further passing the partially cooled sulfur containing gas downward in said indirect heat exchange zone and therein rapidly cooling the partially cooled gas containing elementary sulfur by indirect heat exchange with water under said steam pressure whereby additional liquid sulfur condenses on the walls of said indirect heat exchange zone, passing this latter partially sulfur depleted gas from said heat exchange zone into the bottom of and upwardly through a vertically disposed indirect atmospheric cooler, maintaining the atmospheric cooled condensing surface thereof at a temperature above the freezing point of sulfur but below the temperature of the inlet sulfur containing gas whereby further liquid sulfur is condensed, exhausting the sulfur depleted gas to the atmosphere at a temperature above the freezing point of sulfur but below that at which the gas contains appreciable sulfur vapor in suspension, and recovering the condensed sulfur as the product of the process.

4. A process for the separation of elementary sulfur and its recovery from a hot gas containing elementary sulfur issuing from a free sulfur producing reaction, comprising passing said gas in indirect heat exchange with steam at a steam pressure of about 30 to 43 pounds gage pressure per square inch and thereby slowly cooling said gas to a temperature slightly below its dewpoint but above the freezing point of sulfur whereby a portion of the sulfur condenses as liquid sulfur, rapidly cooling the partly depleted sulfur containing gas by passing same in indirect heat exchange relation with hot water thereby condensing additional sulfur as liquid, passing this latter partially sulfur depleted gas at a temperature of about 280° to 320° F. into the bottom of a vertically disposed indirect atmospheric cooler, maintaining the condensing surface of the atmospheric cooler at a temperature above the freezing point of sulfur but below the temperature of the inlet sulfur containing gas whereby further liquid sulfur is condensed, exhausting the sulfur depleted gas to the atmosphere at a temperature above the freezing point of sulfur and recovering the condensed sulfur as the product of the process.

5. A process for the separation of elementary sulfur and its recovery from a hot gas containing elementary sulfur issuing from a free sulfur producing reaction, comprising passing said gas into the upper end of an indirect vertically disposed heat exchange zone, slowly cooling said sulfur containing gas therein by indirect heat exchange with saturated steam at a pressure of about 30 to 43 pounds per square inch gage thereby condensing sulfur as liquid, further passing the partially cooled sulfur containing gas downward in said indirect heat exchange zone and therein rapidly cooling the partially cooled gas containing elementary sulfur by indirect heat exchange with water under said steam pressure whereby additional liquid sulfur condenses on the walls of said indirect heat exchange zone, passing this latter partially sulfur depleted gas from said heat exchange zone into the bottom of an elongated and vertically disposed indirect atmospheric cooler, maintaining the atmospheric cooled condensing surface thereof at a temperature above the freezing point of sulfur but below the temperature of the inlet sulfur containing gas whereby further liquid sulfur is condensed, exhausting the sulfur depleted gas to the atmosphere at a temperature above the freezing point of sulfur but below that at which the gas contains appreciable sulfur vapor in suspension, and recovering the condensed sulfur as the product of the process.

References Cited in the file of this patent

UNITED STATES PATENTS

| | | |
|---|---|---|
| 2,087,894 | Bacon et al. | July 27, 1937 |
| 2,384,926 | Jones | Sept. 18, 1945 |
| 2,449,110 | Eells | Sept. 14, 1948 |
| 2,594,149 | Gamson | Apr. 22, 1952 |

FOREIGN PATENTS

| | | |
|---|---|---|
| 481,355 | Great Britain | Mar. 7, 1938 |